UNITED STATES PATENT OFFICE.

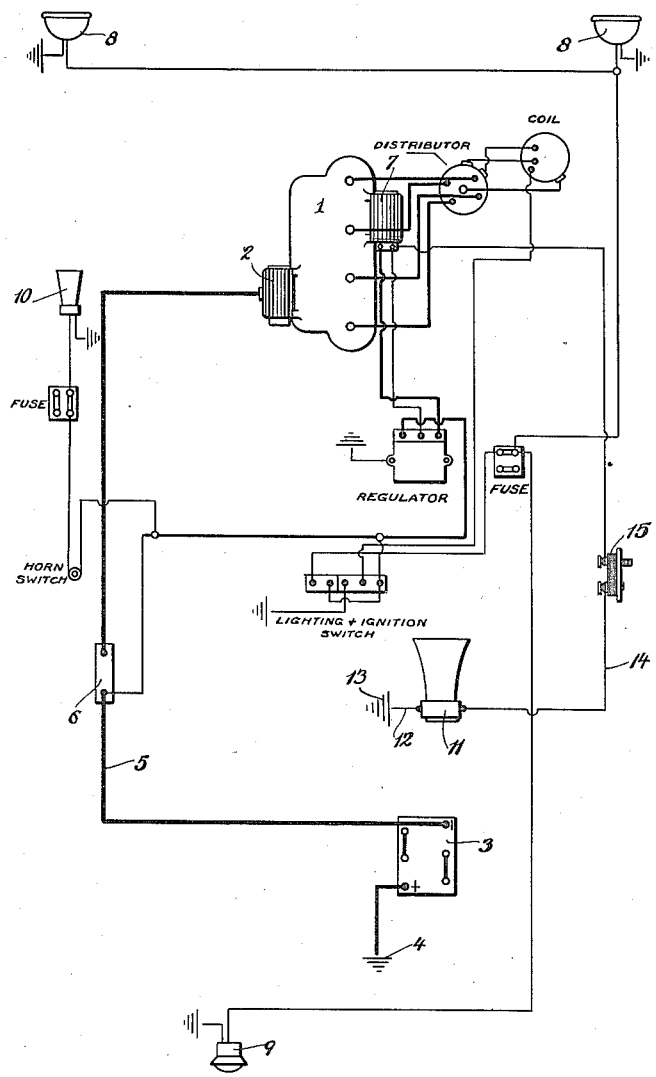

THOMAS F. BURKE, OF PHILADELPHIA, PENNSYLVANIA.

BURGLAR-ALARM FOR AUTOMOBILES.

1,260,866.  Specification of Letters Patent.  Patented Mar. 26, 1918.

Application filed June 5, 1917. Serial No. 172,883.

*To all whom it may concern:*

Be it known that I, THOMAS F. BURKE, a citizen of the United States, residing at Philadelphia, in the county of Philadelphia and State of Pennsylvania, have invented certain new and useful Improvements in Burglar-Alarms for Automobiles, of which the following is a specification.

My invention consists of an improved burglar alarm for automobiles. One object of my invention is to equip an automobile with an audible alarm device which will operate if an unauthorized person attempts to start the engine.

Another object is to so construct my invention that the alarm will continue to operate as long as the generator or engine is in motion.

A further object is to include means which will produce a sound of a character prohibitive on the streets or roadways by the police authorities, thus the alarm produced will be quickly noticed by any one within hearing distance and they will know that an attempt is being made to steal the automobile from which the alarm is sounded.

A further object is to so construct my invention that it will be of simple construction and can be applied to automobiles of various types.

These objects, and other advantageous ends which will be described hereinafter, I attain in the following manner, reference being had to the accompanying drawing which shows a diagrammatic plan view of my invention connected with certain electrically operated and controlled elements such as are now in common use on automobiles.

Referring to the drawing, 1 represents an internal combustion engine of an automobile and is coupled with an electrically operated starting motor 2. This starting motor is in electrical connection with one pole of a storage battery 3, the other pole of said battery being grounded on the frame of the automobile as illustrated at 4.

The electrical connection between the starting motor and the storage battery just described consists of a wire 5 in which is positioned a starter switch 6 by the closing of which the starting motor 2 will be operated to turn the engine until the engine is moved due to its own source of power. An electrical generator 7 is also coupled with the engine 1, so that when the engine is moved, the generator 7 will be operated to supply current to the various attachments to the automobile such for example as electric head lamps 8, a tail lamp 9, and a signaling horn 10, the current from the generator passing through suitable wires and being controlled by switches as illustrated in the accompanying drawing.

My invention does not interfere with the proper operation of any of the elements above enumerated and consists primarily of an electrically operated sound producing device 11 and as illustrated, it is in the form of a horn capable of producing a sound which is prohibitive on streets and roadways by the police authorities. For example, this device can be made in the form of a siren horn which produces an extremely shrill sound of varying pitch.

The device 11 is connected by a wire 12 to a ground 13 on the frame of an automobile, and it will be understood that the frame in this instance forms a conduit for the electric current and renders it unnecessary to equip the automobile with a separate circuit producing wire. The device 11 is also connected with the generator by a wire 14, and this wire includes a switch 15 which is capable of opening and closing the circuit between the device 11 and the generator 7. The switch 15 can be placed in a secret position on the automobile and is normally open so that during the operation of the engine and generator, current will not pass to the device 11. However, if the switch 15 is closed, current will pass through the wire 14 and ground 13, whenever the generator 7 is operated. This will actuate the device 11 to produce the sound above mentioned.

In the use of my invention, when the owner or authorized driver of the automobile leaves the same, he closes the switch 15. This he is able to do because he knows the location of the switch 15. If during his absence from the car, an unauthorized person attempts to start the engine by closing the starting motor switch 6, the engine will be operated as will also be the generator 7 and an alarm will be sounded by the device 11. If, on the other hand, an unauthorized person attempts to start the engine by manually cranking the same, here again the generator will be operated to sound the alarm. Thus it is impossible for the engine to be started either by hand or through the automatic arrangement including the starting switch and starting motor 2.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:

A burglar alarm for automobiles including an engine, a generator coupled to the engine, an electrically operated audible alarm device in circuit with the generator, and a switch included within said circuit and located in a secret position within said automobile, substantially as described.

In testimony whereof I have signed my name to this specification in the presence of two subscribing witnesses.

THOMAS F. BURKE.

Witnesses:
MARY A. INGLAR,
CHAS. E. POTTS.